Patented May 11, 1954

2,678,280

UNITED STATES PATENT OFFICE 2,678,280

GEL POINT INDICATING IMPRESSION MATERIALS

Stanley E. Noyes and Edwin H. Lochridge, Glendale, Calif., assignors to Dental Perfection Company, Glendale, Calif., a corporation of California No Drawing. Application March 21, 1952,
Serial No. 277,908

14 Claims. (Cl. 106—38.35)

This invention has to do with improvements in dental impression materials of the general type comprising a mixture of a gel-forming agent, a metallic ion or compound which is reactive with such agent to form an elastic gel, and a controllant functioning essentially to govern the rate of reaction to assure appropriate time for placement of the material in the mouth before the material sets in its elastically gelled condition.

Impression materials of this type are in general use, and as previously proposed or compounded, may employ any of various gel-forming agents among which are the sodium, potassium and ammonium alginates, the pectin or pectate-derived gellable substances including the alkali metal pectin compounds or pectates, also the gellable oxidized cellulose type of compounds, typically sodium, potassium or ammonium carboxy methyl cellulose. For purposes of the present invention the alginates may be regarded as preferred, but in its broad aspects the invention contemplates the use of any of these gelling agents, or mixtures thereof, which are combinable with a metal ion, as in a base exchange type reaction, to form an elastic gel capable of accurately reproducing the subjects to be cast.

Useable compounds of metallic ions reactive with the gelling agent are the calcium sulfates, i. e., the decahydrate, dihydrate and hemi-hydrate, lead compounds including lead oxide, lead monosilicate, lead disilicate, basic lead sulfate, basic lead carbonate and other lead salts, also salts of other metals including zinc, strontium, etc. Only in certain specific aspects is the invention concerned with the particular metal or combination of metals used, and in general it may be stated that in its broader objectives, the invention contemplates the use of any metallic compound or mixtures thereof, reactive with the gelling agent to produce a satisfactory elastic gel at a determinable pH value or range. As will appear, the invention is more essentially concerned with the physical occurrence of the gel formation, whatever may be the specific reactants, and with the indication that the gel point has been reached.

The controllants referred to above are generally known as retarders, in that they tend to reduce the rate of gellation to within a desired time range. Commonly used retarders include the alkali metal carbonates, notably sodium carbonate, and the alkali metal phosphates and polyphosphates, e. g. trisodium phosphate and polyphosphate, sodium meta, ortho and pyro-phosphates. Also useable as the retarder may be the metal salts of substituted acids of ethylene diamine dealt with in a copending application Serial No. 260,929, now Patent 2,657,971, issued November 3, 1953. The invention contemplates that any of these retarders or mixtures thereof may be used in accordance with the requirements of any particular impression material.

These impression materials also include appropriate fillers such as powdered talc, clay, diatomaceous earth, calcium carbonate, silica and the like, all of which are relatively inert.

The invention has for its primary object to remove any reason or likelihood for error in the use of these materials, and in so doing to obviate the making of inaccurate or broken impressions and the consequent expense and loss of time and materials, due to removal of the material from the mouth before it has reached the gel point. As herein used, the term "gel point" will be understood to mean progression of the gelling reaction to the stage that the mixture has converted to a water insoluble elastic gel of such strength and rigidity as to be capable of removal from all normal irregularities or undercuts in the mouth without breakage of the impression and without appreciable shape and dimension variation from the shape and dimensions of the subjects to be cast (by plaster of Paris poured against the impression). It is found in the setting of a given impression material mixture, that its gel point is reached at a determinable pH value or narrow pH range, and that different mixtures may have rather widely varying gel point pH values or ranges.

Ordinarily these impression materials are supplied to the dentist with instructions as to the length of time the material should be left in the patient's mouth to assure proper gellation. It is found, however, that the impressions may be prematurely removed, sometimes inadvertently and at other times because of abnormal conditions such as excess alkalinity of the patient's mouth or of the water used in preparing the impression material, either of which may retard the gellation. Premature removal of course may result in breakage of the impression at the time, or more seriously, in there being inaccuracies which may not be discovered until the stone is cast and it is then found necessary to repeat the whole procedure.

The present invention presents a solution for these difficulties in that it provides improved impression materials which are self-indicative of their arrival at the gel point, and assume their indicative characteristic only when that point is reached. Thus all uncertainty as to the gelled condition of the material is eliminated by its property of changing color, and specifically by undergoing a distinct change from the color had by the material when first mixed and put into the mouth, to the different color to which it quickly changes as the gel point is reached.

In accordance with the invention we incorporate with the impression material mixture including the gel forming agent, metallic compound, retarder and filler, an indicator selected for its color changeability at the pH of the gel point for that particular mixture. It may be stated generally that these impression materials may have gel points at pH values ranging from about 6 to 10, and therefore that particular care should be taken to match the indicator, i. e. in terms of its color change pH, to the gel point pH of the mixture. Also there should be sufficiently close correspondence between the indicator color change and gel point pH values, to assure that the indicator color change will occur not appreciably before but coincidentally with or at least quickly after the gel point is reached.

The following may be cited as typical indicators, being products of Eastman Organic Chemical Co. and given its designation. In each instance, the pH value indicates the approximate point at which the indicator changes color in an alkaline solution changing toward neutrality.

| Indicator | pH |
|---|---|
| Methyl Red | 6.2 |
| Lacmoid | 6.1 |
| Propyl Red | 6.5 |
| Chlorphenol Red | 6.8 |
| Methyl Violet | 6.1 |
| p-Nitrophenol | 7.0 |
| Bromcresol Purple | 6.8 |
| Bromthymol Blue | 7.5 |
| m-Dinitrobenzoyleneurea | 8.0 |
| Rosolic acid | 7.0 |
| Brilliant Yellow | 7.8 |
| Neutral Red | 8.0 |
| Phenol Red | 8.4 |
| m-Nitrophenol | 8.5 |
| Cresol Red | 8.8 |
| Curcumin | 8.6 |
| Tropacolin | 8.6 |
| m-Cresol Purple | 9.0 |
| 2,4-dinitrophenol | 9.2 |
| Thymol Blue | 9.5 |
| a-Naphtholbenzein | 10.0 |
| o-Cresolphthalein | 9.8 |
| Phenolphthalein | 10.0 |
| Thymolphthalein | 10.5 |

As illustrative of compositions whose gel points are reached within the 7 to 8 pH range, the following examples may be given of formulations employing respectively calcium sulphate and lead silicate as the metallic components, and forming when mixed with water (e. g. 8° cc.) in Example 1, calcium alginate at about 7.2 pH, and in Example 2, lead alginate at about 7.5 to 7.8 pH.

*Example 1*

| | Grams |
|---|---|
| Diatomaceous earth | 5.5 |
| Potassium algin | 1.7 |
| Tetrasodium pyrophosphate | .350 |
| Sodium fluosilicate | .100 |
| Calcium sulfate hemihydrate | .600 |
| Rosolic acid | .002 |

*Example 2*

| | Grams |
|---|---|
| Diatomaceous earth | 4.5 |
| Potassium algin | 1.8 |
| Tetrasodium pyrophosphate | .200 |
| Sodium fluosilicate | 1.0 |
| Lead silicate | 5.0 |
| Rosolic acid | .002 |

To favor definiteness in the relationship between arrival of the impression material at its gel point and the color change of the indicator, it may be desirable to produce an acceleration of the gelling reaction or reactions as the gel point is approached. This may be done, in effect, by making available at a later stage in the gelling period, a greater supply of metallic ions for reaction with the gel-forming component than during the earlier stage of the gelling reaction. This effect may be accomplished by using two different metallic compounds which, in relation to the action of the retarder, permit reaction of both metallic ions with the gel-forming component but one more actively than the other or at an accelerated rate, at the gel point is approached.

As an example, we may use an impression material composition containing both a calcium salt, e. g. calcium sulphate hemihydrate, together with a lead salt, e. g. lead monosilicate, together with a retarder and an acidic compound tending to solubilize the lead compound. As typical of various useable retarders tetrasodium pyrophosphate may be cited, and as a lead solubilizing component we may use a fluosilicate, typically sodium fluosilicate. Using typically an alginate gel-forming agent, the material when mixed with water produces formation of both lead alginate and calcium alginate, but throughout the earlier stage of the gel-forming reactions, the rate of calcium alginate formation is kept relatively slow by reason of the reactivity of the retarder with the calcium sulphate. However, as soon as the retarder is consumed, the calcium ions available for reaction with the alginate are increased and the gelling reaction thus progresses at a more rapid rate, and thus continues relatively rapidly until the gel point is reached.

The following formulation, having a gel point at about 7.2, is illustrative of the type of composition just discussed:

*Example 3*

| | Grams |
|---|---|
| Diatomaceous earth | 5.5 |
| Potassium algin | 1.7 |
| Tetrasodium pyrophosphate | .350 |
| Sodium fluosilicate | .100 |
| Calcium sulphate hemihydrate | .600 |
| Lead silicate | 4.0 |
| Rosolic acid | .002 |

We claim:

1. A dental impression material comprising a gel forming agent selected from the group consisting of compounds having carboxylic acid groups and the salts of such compounds, a compound of a polybasic metal chemically reactive with said agent in solution and present in said material in an amount sufficient to form by reaction with said agent an elastic gel at a gel point having determinable pH value not less than about 6, and an indicator compound uniformly dispersed in said material and having predetermined color changeability in relation to said pH value so that as said gel point is reached, distinct color changeability is imparted to the impression material.

2. A dental impression material comprising a gel forming agent selected from the group consisting of compounds having carboxylic acid groups and the salts of such compounds, a compound of a polybasic metal chemically reactive with said agent in solution and present in said material in an amount sufficient to form by reaction with said agent an elastic gel at a gel point having determinable pH value not less than about 6, and an indicator compound uniformly dispersed in said material and having predetermined color changeability in relation to said pH value so that as said gel point is reached, distinct color changeability is imparted to the impression material, said indicator having its color changeability at a pH value closely corresponding to the pH value of the gel point.

3. A dental impression material comprising a gel forming agent selected from the group consisting of compounds having carboxylic acid groups and the salts of such compounds, a compound of a polybasic metal chemically reactive with said agent in solution and present in said material in an amount sufficient to form by reaction with said agent an elastic gel at a gel point having determinable pH value not less than about 6, a retarder and a filler, and an indicator compound uniformly dispersed in said material and having predetermined color changeability in relation to said pH value so that as said gel point is reached, distinct color changeability is imparted to the impression material.

4. A dental impression material comprising a powdered uniform mixture containing a gel forming agent selected from the group consisting of compounds having carboxylic acid groups and the salts of such compounds, a compound of a polybasic metal chemically reactive with said agent in aqueous solution and present in said material in an amount sufficient to form by reaction with said agent an elastic gel at a gel point having a determinable pH value not less than about 6, a controllant of the rate of such reaction, and an indicator compound uniformly dispersed in said material and having predetermined color changeability in relation to said pH value so that as said gel point is reached, distinct color changeability is imparted to the impression material.

5. An impression material as defined in claim 4, in which the indicator has a color change from pink to white.

6. An impression material as defined in claim 4, in which the metallic component comprises different compounds reactive with the gel forming component to produce gellation at an accelerated rate as the gel point is approached.

7. An impression material as defined in claim 4, in which the gel forming component comprises an alginate.

8. An impression material as defined in claim 4, in which the gel forming component comprises an alginate and the metallic component comprises a lead compound reactive with the alginate.

9. An impression material as defined in claim 4, in which the gel forming component comprises an alginate and the metallic component comprises calcium sulfate reactive with the alginate.

10. An impression material as defined in claim 4, in which the gel forming component comprises an alginate and calcium sulfate and a lead compound reactive with the alginate.

11. An impression material as defined in claim 4, comprising also a fluosilicate.

12. An impression material as defined in claim 4, comprising also a fluosilicate, and in which the metallic component includes a lead silicate.

13. An impression material as defined in claim 4, in which the gel forming component comprises a pectate.

14. An impression material as defined in claim 4, in which the gel forming component is a carboxy methyl cellulose.

References Cited in the file of this patent

UNITED STATES PATENTS

| Number | Name | Date |
|---|---|---|
| 2,265,118 | Van Rossem | Dec. 2, 1941 |
| 2,425,118 | Noyes | Aug. 5, 1947 |
| 2,568,752 | Lochridge | Sept. 25, 1951 |